United States Patent [19]

Giannakidis

[11] 4,351,864

[45] Sep. 28, 1982

[54] MOLDING HAVING ENCAPSULATED METALLIZED FILM

[75] Inventor: Dimitrios Giannakidis, Athens, Greece

[73] Assignee: The Standard Products Company, Cleveland, Ohio

[21] Appl. No.: 261,041

[22] Filed: May 6, 1981

[51] Int. Cl.³ .................... B60R 13/00; B32B 15/08
[52] U.S. Cl. ........................................ 428/31; 428/99; 428/407; 428/461; 428/463; 428/516; 428/518; 52/716
[58] Field of Search ............... 428/31, 99, 407, 463, 428/461, 516, 518, 913, 918

[56] References Cited

U.S. PATENT DOCUMENTS

| | | |
|---|---|---|
| 3,013,919 | 12/1961 | Bialy . |
| 3,086,216 | 4/1963 | Brooks et al. . |
| 3,138,834 | 6/1964 | Shanok et al. . |
| 3,152,950 | 10/1964 | Palmquist et al. . |
| 3,226,287 | 12/1965 | Shanok et al. . |
| 3,232,818 | 2/1966 | Loew et al. . |
| 3,547,516 | 12/1970 | Shanok et al. . |
| 3,616,099 | 10/1971 | Shanok ........................... 428/31 |
| 3,811,989 | 5/1974 | Hearn . |
| 3,843,475 | 10/1974 | Kent . |
| 3,881,042 | 4/1975 | Ungerer . |
| 3,914,482 | 10/1975 | Sawa et al. . |
| 4,081,504 | 3/1978 | Wenrick et al. . |
| 4,101,698 | 7/1978 | Dunning et al. . |
| 4,115,619 | 9/1978 | Kurfman et al. . |

FOREIGN PATENT DOCUMENTS

| | | | |
|---|---|---|---|
| 53884 | 11/1972 | Australia | 428/31 |
| 929984 | 7/1973 | Canada | 428/31 |
| 2852387 | 7/1979 | Fed. Rep. of Germany | 428/31 |
| 52-47220 | 4/1977 | Japan | 428/31 |
| 1189105 | 4/1970 | United Kingdom | 428/31 |

Primary Examiner—P. Ives
Attorney, Agent, or Firm—Harness, Dickey & Pierce

[57] ABSTRACT

A molding having a layered structure wherein a bright film which has been metallized on both sides is encapsulated in ionomer resin material. The molding is suitable for decorative and protective uses on automotive vehicles.

10 Claims, 2 Drawing Figures

U.S. Patent  Sep. 28, 1982  4,351,864
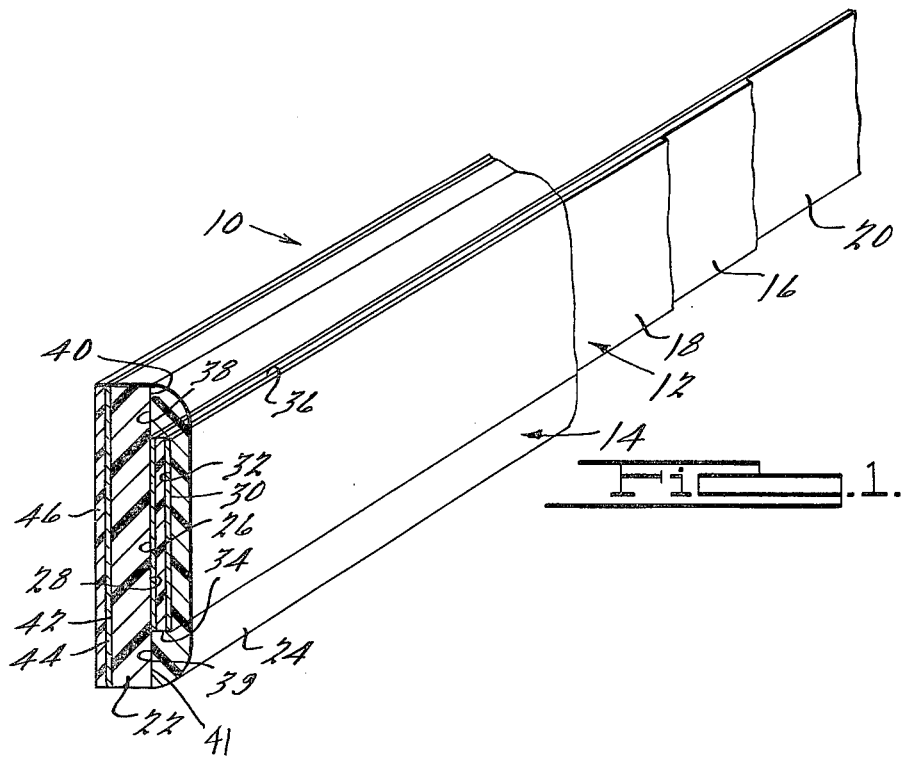
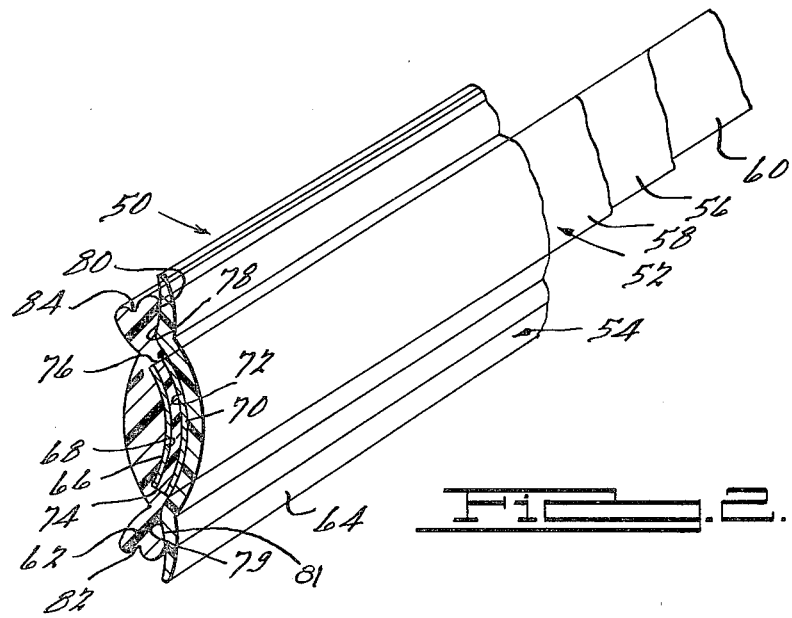

4,351,864

MOLDING HAVING ENCAPSULATED METALLIZED FILM

BACKGROUND AND SUMMARY OF THE INVENTION

The present invention relates to a laminated molding or trim strip having a metallic appearance. More particularly, the present invention relates to a decorative molding having a laminate structure with a bright metallized film sandwiched between ionomer resin layers. Moldings made in accordance with the present invention have an attractive, bright metallic appearance and are suitable for decorative and/or protective use on automotive vehicles as body side moldings, windshield reveal moldings, and the like.

Automotive moldings are well known and have been used for many years to improve the appearance and protect the bodies of automotive vehicles. In recent years plastic materials have been increasingly used in the manufacture of moldings. Plastic materials, of course, do not rust and offer cost and weight advantages over metal moldings. Furthermore, moldings of plastic materials can be given a metallic appearance by incorporating a metal layer in the molding. Thus, plastic moldings can have excellent appearance characteristics similar to metal moldings. However, problems of delamination are encountered when incompatible plastic materials are used in a composite molding laminate. For example, it has been found to be very difficult to securely laminate an ionomer resin layer to polyvinylchloride. A similar problem is encountered if it is desired to laminate an ionomer resin layer to a polyester film or layer.

Thus, if it is desired to use an ionomer resin to encapsulate a polyester film which has been metallized to one side to provide a molding having a bright metallized appearance, a problem is encountered regarding bonding of the ionomer resin to the polyester. Only the metallized side of the polyester will bond adequately to the ionomer resin. Then when the molding is bent, crazing or buckling of the metal layer will occur, resulting in serious deterioration of the metallic appearance.

It is desirable to use ionomer resins in moldings, however, as they are tough, resilient resins particularly desirable for use on automobiles and the like. Ionomer resins are thermoplastic resin copolymers of ethylene and a vinyl monomer acid such as methacrylic acid and are grease, acid and solvent resistant and light weight. Unfortunately, ionomer resins can be readily bonded to metal or other ionomer resins but are difficult to bond to other resin materials such as the polyvinylchloride or polyester resins often used in molding manufacture.

Therefore, it would be desirable if a molding could be provided of a construction incorporating a bright metallized film encapsulated in an ionomer resin wherein good bonding can be achieved between the metallized film and ionomer resin so as to avoid deterioration due to crazing or delamination. Accordingly, the present invention provides an elongated molding comprising a metallized film layer, metallized on both sides and sandwiched between a body and a covering layer comprised of ionomer resin. Further understanding of the invention will be had from the attached drawing and the following disclosure.

BRIEF DESCRIPTION OF THE DRAWINGS

FIG. 1 is a perspective view, in transverse section and broken away, of a preferred embodiment of the present invention; and FIG. 2 is a perspective view, in transverse section and broken away, of an alternative preferred embodiment of the present invention.

DESCRIPTION OF THE INVENTION

Now referring to the Figures, in FIG. 1 a preferred embodiment of a molding of the present invention is shown and indicated generally by the numeral 10. Molding 10 broadly comprises a laminate construction of a metallized film 12 encapsulated in ionomer resin body 14. As will be readily appreciated by those skilled in the art, metallized film 12 presents a bright metallic appearance to the molding while ionomer resin body 14 provides tough molding which can serve a protective as well as decorative function while also protecting and encapsulating film 12.

Metallized film 12 comprises a thin sheet 16 which has been coated with metal on both sides. A suitable film 12 is a resin film such as polyester film which has been vacuum metallized on both sides so as to have metal coating 18 on one surface thereof and metal coating 20 on the opposite surface thereof. Metallized coatings 18 and 20 can suitably comprise aluminum metal and can be provided on film 16 by vacuum metallizing or any other conventional metallizing process. Suitable metallized film 12 can be Mylar ® film from the E. I. DuPont Company which has been vacuum metallized with aluminum. Of course, it will be appreciated by those skilled in the art that metal coatings 18 and 20 are very thin in cross section and are not shown to scale in the figures and further that suitable thicknesses for film 16 and coatings 18 and 20 are those which are conventional in the art.

Ionomer resin body 14 comprises base 22 and cover layer 24. Each of base 22 and cover layer 24 comprise an ionomer resin, however, base 22 preferably contains a pigment such as a black pigment and is opaque while cover layer 24 is transparent so that the outwardly facing metallized coating 18 can be seen through cover layer 14 to give the desired metallic appearance to molding 10. Suitable ionomer resins for use herein are those well known in the art and include, for example, an ultraviolet stabilized Surlyn ® blend such as PS20N supplied by Adell.

In the manufacture of molding 10, base 22 of opaque ionomer resin can be extruded by means of a horizontal extruder. Then metallized film 12 can be unrolled onto facing surface 28 of base 22 so that contiguous surfaces 28 of base 22 and 26 of metal coating 20 are bonded through conventional extrusion technique involving heat. Next, transparent ionomer cover layer 24 can be extruded by a vertical extruder onto metallized film 12 and the shoulders of base 22 so that contiguous surface 30 of metal coating 18 bonds to surface 32 of cover layer 24 and surfaces 38 and 39 of cover layer 24 bond to contiguous surfaces 40 and 41 of base 22. All contiguous surfaces bond through conventional extrusion technique involving heat. Also, side edges 34 and 36 of metallized film 12 are covered by and bonded to the contiguous portion of cover layer 24.

Ionomer resin material bonds readily to metal or other ionomer resin material using only conventional extrusion techniques with heat. Hence, molding 10 is provided wherein metallized film 12 is encapsulated in and well bonded to body 14 comprising ionomer resin base 22 and cover layer 24. Contiguous surfaces therein are either both of ionomer resin or are ionomer resin and metal. Hence, bonding problems are avoided in manufacture of molding 10 and, once made, problems of crazing or delamination are also avoided. Furthermore, the edges of the metallized film are sealed and protected from the environment to avoid deterioration due to moisture or other environmental factors.

Means for attaching molding 10 to an automobile body side or the like can be readily provided as follows. As shown in FIG. 1, a metal film 44 such as aluminum film or foil can be bonded to surface 42 of base 22 by any conventional technique. The ionomer resin composition of base 22 will readily bond with heat to metal film 44. Then, metal film 44 can be conventionally bonded to a substrate 46 which can be, for example, double-faced adhesive tape or a polyvinylchloride or other plastic or metal body on which it is desired to mount molding 10. Alternatively, metal layer 44 can be provided as a metal coating on a substrate film 46 of Mylar ® which has a PVC coating (not shown in the figures) on the opposite side thereof for subsequent bonding to a PVC body on which it is desired to mount molding 10. Of course, still other alternatives will be apparent to those skilled in the art.

Now referring to FIG. 2, an alternative embodiment of the present invention is shown and indicated generally by the numeral 50. Molding 50 broadly comprises a laminate construction of a metallized film 52 encapsulated in an ionomer resin body 54 and is of a construction similar to that of the embodiment of the present invention disclosed above, molding 10. Metallized film 52 thus provides a bright metallic appearance to molding 50 while ionomer resin body 54 provides tough molding characteristics which can serve a protective as well as decorative function while also protecting and encapsulating metallized film 52.

Metallized film 52 is of a construction analogous to metallized film 12 previously disclosed and has a sheet 56 which has been coated on both sides with metal to provide metal coatings 58 and 60. Preferably, metallized film 52 is a polyester film which has been vacuum metallized with aluminum on both faces thereof.

Ionomer resin body 54 comprises a base 62 and cover layer 64. As was the case with molding 10, base 62 preferably contains a pigment such as a black pgiment and is opaque while cover layer 64 is transparent so that the outwardly facing metallized coating 58 can be seen through cover layer 64.

The manufacture of molding 50 is also analogous to that of molding 10. Thus, in the manufacture of molding 50, base 62 can be extruded by means of a horizontal extruder whereupon metallized film 52 can be laminated to surface 74 of base 62 by conventional extrusion techniques involving heat. It should be noted that in the manufacture of molding 50, metallized film 52, in a sense, is embedded into base 62 rather than cover layer 64. Thus, side edges 74 and 76 of metallized film 52 are bonded to and protected by the contiguous portions of base 62. Then transparent cover layer 64 can be extruded and bonded to base 62 and metallized film 52 with edge surface portion 78 of cover layer 64 bonded to contiguous surface edge portion 80 to base 62 and edge surface portion 79 of cover layer 64 bonded to contiguous surface edge portion 81 of base 62. Surface portion 72 of cover layer 64 is, of course, bonded to metal coating 70 of metallized film 52. It will, of course, be appreciated that as shown in FIG. 2, cover layer 64 can extend transversely beyond base 62. Base 62 also has sidewardly open notches 82 and 84 which are adapted to snappingly engage corresponding retention means in a conventional manner to provide means for retaining or mounting molding 50 on an automotive vehicle or the like.

It is to be understood that the present invention is subject to modifications and variations and it will be evident that those skilled in the art, once having benefit of the disclosure of the specific embodiments of this invention disclosed herein, may now make numerous modifications of the specific embodiments described herein without departing from the inventive concept of this invention. For example, it will be appreciated that the base and cover layer of a molding of this invention can be simultaneously extruded to encapsulate the bright metallized film therebetween. Consequently, this invention is to be construed as limited solely by the scope and spirit of the appended claims.

What is claimed is:
1. An automotive molding having:
   a body comprising an ionomer resin;
   a cover layer comprising an ionomer resin; and
   a film coated on both sides with metal and sandwiched between and bonded to said body and said cover layer.
2. A molding as in claim 1 wherein said metallized film is a polyester film having aluminum coating on both sides thereof.
3. A molding as in claim 2 wherein said body contains a pigment and is opaque and said cover layer is transparent.
4. A molding as in claim 3 wherein said body has an additional metal layer bonded to an outwardly facing surface thereof.
5. A molding as in claim 4 wherein said additional metal layer is bonded to a layer of two-faced adhesive tape.
6. A molding as in claim 4 wherein said additional metal layer is bonded to a substrate comprised of polyvinylchloride.
7. A molding as in claim 3 wherein said molding is elongated and said cover layer extends transversely beyond said body.
8. A molding as in claim 1 wherein said additional metal layer is an aluminum coating on a polyester film.
9. A molding as in claim 3 wherein said base has means for attaching to an automotive vehicle.
10. A molding as in claim 9 wherein said means comprises a pair of resilient legs with notches adapted to engage cooperating retention means.

* * * * *

UNITED STATES PATENT AND TRADEMARK OFFICE
CERTIFICATE OF CORRECTION

PATENT NO. : 4,351,864
DATED : September 28, 1982
INVENTOR(S) : Dimitrios Giannakidis It is certified that error appears in the above—identified patent and that said Letters Patent are hereby corrected as shown below:

Column 1, line 38,            "to" should be --on--

Column 3, line 43,            "pgiment" should be --pigment--

Column 4, line 54, (Claim 8)     "1" should be --4--

Signed and Sealed this

Twenty-first Day of December 1982

[SEAL]

Attest:

GERALD J. MOSSINGHOFF

Attesting Officer     Commissioner of Patents and Trademarks